Patented Apr. 23, 1929.

1,709,985

UNITED STATES PATENT OFFICE.

GEORG KRÄNZLEIN AND RALF EBERT, OF HOCHST-ON-THE-MAIN, GERMANY, ASSIGNORS TO I. G. FARBENINDUSTRIE AKTIENGESELLSCHAFT, OF FRANKFORT, GERMANY.

VAT DYESTUFFS OF THE ANTHRACENE SERIES AND PROCESS OF MAKING SAME.

No Drawing. Application filed June 11, 1925, Serial No. 36,520, and in Germany August 13, 1924.

It is known that certain vat dyestuffs can be produced by fusing di- or poly-anthrimides—obtainable by condensation of α-aminoanthraquinones with α-halogenanthraquinones—with alkaline or acid condensing agents, for instance aluminium chloride. Furthermore it is known that the said vat dyestuffs can be converted into uniform and commercially valuable compounds by subsequently oxidizing them, for instance by means of chromic acid or salts of hypochlorous acid.

These vat dyestuffs are carbazole derivatives, the most simple type having the following constitution:

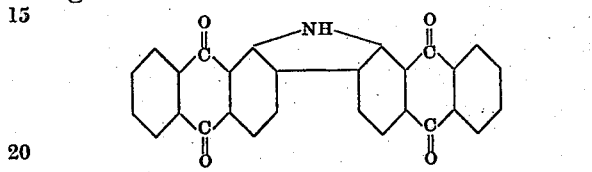

The statement in U. S. Patent No. 1,052,480 that these dyestuffs are N-dianthraquinonylindanthrenes is an error which was corrected in German Patent No. 267,522. (See also Synthesis of Nitrogen Ring Compounds, Hollins, D. Van Nostrand Co., New York, 1924, page 166).

Now we have found that these dyestuffs can be transformed into such of much greater purity by treating them with concentrated sulfuric acid, preferably at an elevated temperature and in presence or absence of boric acid, and then again subjecting them to a suitable oxidation.

This result is of a great technical value, as it presents a new method for preparing vat dyestuffs yielding dyeings of a particularly great purity of shade and excellent fastness. For instance from α-α-dianthrimide by this new process there may be obtained a vat dyestuff giving a particularly bright yellow tint of perfect fastness to boiling with a sodium carbonate solution.

The following example illustrates our invention, the parts being by weight:

10 parts of the vat dyestuff produced by oxidizing the condensation product obtainable by fusing α-α-dianthrimide with aluminium chloride, are heated for 2-5 hours to 75–110° C. in 150 parts of sulfuric acid monohydrate or 200 parts of concentrated sulfuric acid, if desired, with the addition of boric acid. The molten mass is poured into water, then filtered off, washed until neutral and oxidized by means of hypochlorite solution. After having filtered off the resulting mass and washed it until neutral, the coloring matter is obtained in the form of a deep-yellow, clear paste. It constitutes an excellent vat dyestuff which gives considerably purer tints with a more reddish hue than the parent product.

We claim:

1. The process of producing vat dyestuffs of the anthracene series, consisting in treating with a strong sulfuric acid at a temperature not exceeding 110° C. the vat dyestuffs obtainable by oxidizing the condensation products produced by fusing an α-α-polyanthrimide with a condensing agent, precipitating the product from the sulfuric acid solution and oxidizing the resulting product.

2. The process of producing vat dyestuffs of the anthracene series, consisting in treating with a strong sulfuric acid at a temperature not exceeding 110° C. in presence of boric acid the vat dyestuffs obtainable by oxidizing the condensation products produced by fusing an α-α-polyanthrimide with a condensing agent, precipitating the product from the sulfuric acid solution and oxidizing the resulting product.

3. As new products, the vat dyestuffs obtainable by treating with a strong sulfuric acid at a temperature not exceeding 110° C. the vat dyestuffs obtainable by oxidizing the condensation products produced by fusing an α-α-polyanthrimide with a condensing agent, precipitating the product from the sulfuric acid solution and oxidizing the resulting product.

4. As a new product, the vat dyestuff obtainable by treating with a strong sulfuric acid at a temperature between 75 and 110° C. the vat dyestuff obtainable by oxidizing the condensation product produced by fusing α-α-dianthrimide with a condensing agent, precipitating the product from the sulfuric acid solution and oxidizing the resulting product; said dyestuff giving a vat which dyes cotton a yellow tint of a more reddish hue than the tints obtainable by the parent dyestuffs.

In testimony whereof, we affix our signatures.

GEORG KRÄNZLEIN.
RALF EBERT.